3,202,163
PRESSURE RATIO CONTROLLER
George R. Howland, Dearborn, Mich., assignor to Ford Motor Company, Dearborn, Mich., a corporation of Delaware
Filed Jan. 2, 1962, Ser. No. 163,517
9 Claims. (Cl. 137—98)

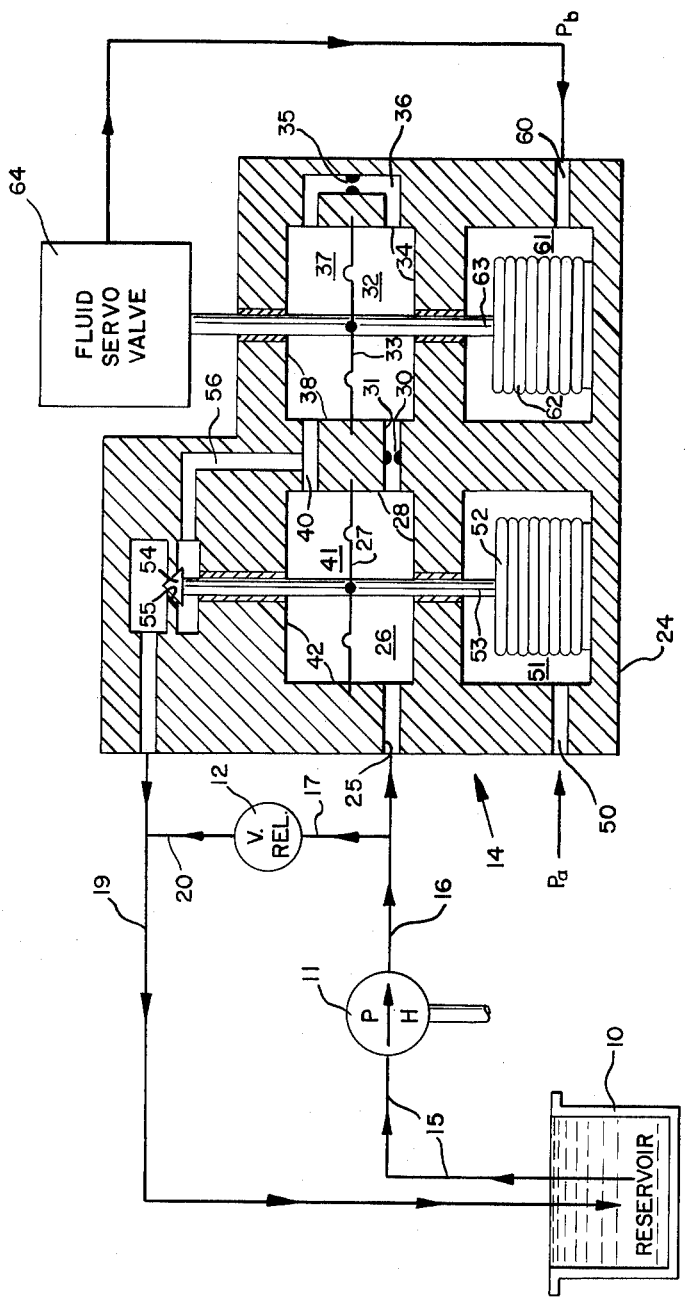

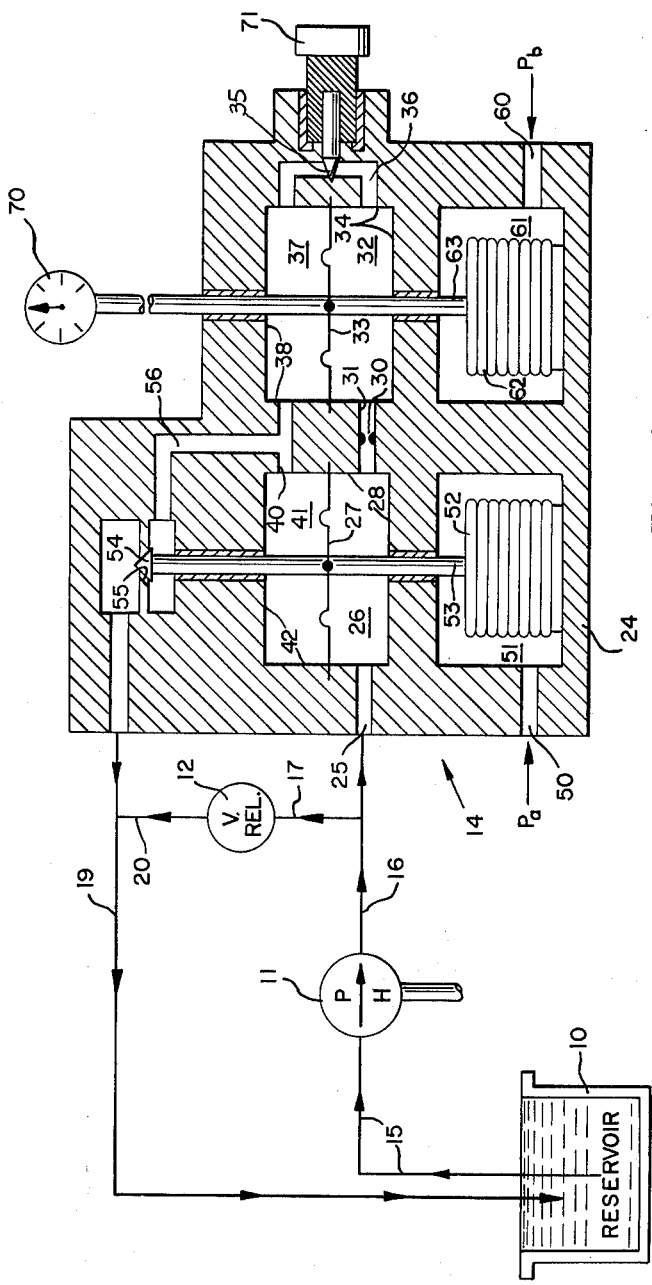

This invention relates to a pressure ratio controller.

The invention described hereinafter in detail provides a device that receives two pressure signals and compares the ratio of these two signals to a selected ratio. If the ratio of the two pressure signals and the selected ratio are not equal, a signal will be generated. The signal may operate a valve or other control means which will, in turn, alter the input signal or signals and consequently the ratio of the two pressure signals.

The invention utilizes a minimum of moving parts while maintaining a high degree of accuracy.

It is the object of the invention to provide a pressure ratio controller.

Another object of the invention is to provide a pressure ratio controller that utilizes a minimum number of moving parts.

Another object of the invention is to provide an accurate pressure ratio controller.

Other objects and advantages of the invention will become apparent when the detailed description is read in conjunction with the drawings, wherein:

FIGURE 1 is a schematic drawing of the invention; and,

FIGURE 2 is a schematic drawing of an alternative embodiment of the invention.

Referring to FIGURE 1, the preferred embodiment utilizes a fluid reservoir 10 connected in circuit with a fluid pump 11, a pressure relief valve 12 and the pressure ratio controller 14. The fluid reservoir 10 is connected to the fluid pump 11 by the pipe 15. The fluid pump 11 is connected to the pressure ratio controller by the pipe 16 and to the pressure relief valve by the pipes 16 and 17. The pressure relief valve 12 forms part of a short circuit to the reservoir 10. The pressure relief valve is connected to the return pipe 19 by the pipe 20. The return pipe 19 forms a return path from the pressure ratio controller 14 and from the pressure relief valve 12 to the fluid reservoir 10.

The pressure ratio controller 14 includes a housing 24 that has an input port 25. The input port 25 is connected to a fluid chamber 26 that is formed by a first pressure responsive force member or more particularly a flexible diaphragm 27 and the walls 28. A fluid restriction means or more particularly orifice 30 is connected to the fluid chamber 26 by a passageway 31 that also communicates with a fluid chamber 32. The fluid chamber 32 is formed by a third pressure responsive force member or more particularly a flexible diaphragm 33 and the walls 34. A second fluid restriction means or more particularly orifice 35 is connected to the fluid chamber 32 by a passageway 36. The passageway 36 is also connected to a fluid chamber 37 that is formed by the flexible diaphragm 33 and the walls 38. A passageway 40 connects the fluid chamber 37 with a fluid chamber 41 that is formed by the flexible diaphragm 27 and the walls 42.

The pressure ratio controller has a first signal input means comprising an input port 50 which is connected to a fluid chamber 51. A second pressure responsive force member or more particularly evacuated bellows 52 is located in the fluid chamber 51. The bellows 52 has a shaft or first force balance member 53 which is rigidly connected to the flexible diaphragm 27. A variable restricting means 54 is rigidly attached to the end of shaft 53. The variable restricting means 54 cooperates with the third flow restriction means 55. A passageway 56 connected to the passageway 40 connects the third flow restriction means 55 to the fluid chambers 37 and 41.

The pressure ratio controller has a second signal input means comprising an input port 60 which is connected to a fluid chamber 61 containing a fourth pressure responsive force member or more particularly evacuated bellows 62. The bellows 62 has a shaft or second force balance member 63 which is rigidly connected to the flexible diaphragm 33. The shaft 63 may also be connected to a fluid-servo valve 64. Although a fluid-servo valve has been shown in the drawings, any control element that directly or indirectly alters the input signal or signals can be employed.

The functioning of the preferred embodiment can be readily understood by first considering the physical relationships that govern its operation.

If a hydraulic fluid is passed through an orifice or a flow restriction means, it can be shown that the fluid flow W is related to the pressure drop $\Delta P$ across the restriction as follows:

$$W = A\sqrt{\Delta P} \qquad (1)$$

where A is the flow number and is dependent on the geometry of the restriction and the density of the fluid. If two restrictions are placed in series, then the flow through the two restrictions is equal. Therefore:

$$W = A_1\sqrt{\Delta P_1} = A_2\sqrt{\Delta P_2} \qquad (2)$$

or $$\left(\frac{A_2}{A_1}\right)^2 = \frac{\Delta P_1}{\Delta P_2}$$

where $A_1$ equals the flow number for the first restriction in series and $A_2$ is the flow number for the second restriction in series. The pressure $\Delta P_1$ is the pressure drop across the first restriction and the pressure $\Delta P_2$ is the pressure drop across the second restriction.

If the overall pressure drop equals $\Delta P$, then:

$$\Delta P = \Delta P_1 + \Delta P_2 \qquad (3)$$

If 1 is added to both sides of the Equation 2 and the Equation 3 is substituted, Equation 2 simplifies to:

$$\left(\frac{A_2}{A_1}\right)^2 + 1 = \frac{\Delta P_1 + \Delta P_2}{\Delta P_2} = \frac{\Delta P}{\Delta P_2} \qquad (4)$$

Since $$\left(\frac{A_2}{A_1}\right)^2 + 1 = \text{constant}$$

Equation 4 can be simplified to:

$$\frac{\Delta P}{\Delta P_2} = K$$

In the preferred embodiment it is desired that the ratio of two input signals $P_a$ and $P_b$ equal a selected value. If the selected value is equated to the constant K, the relationship which the device follows is:

$$\frac{\Delta P}{\Delta P_2} = K = \frac{P_a}{P_b}$$

or $$\frac{P_a}{\Delta P} = \frac{P_b}{\Delta P_2} \qquad (5)$$

If $\Delta P$ is made equal to $P_a$ and $P_b$ is made equal to $\Delta P_2$, the equation will be satisfied and the ratio of $P_a/P_b$ will be equal to the selected value K. The following description will describe the operation of the device in satisfying the equation.

In operation, a fluid will enter the fluid chamber 26 of the pressure ratio controller 14 at a given pressure P. The pressure P will cause a force to be exerted on the diaphragm 27. The fluid will flow through the orifice 30 in passageway 31 into the fluid chamber 32. The flow through the passageway 31 and the orifice 30 causes a pressure drop $\Delta P_1$. A pressure, $P-\Delta P_1$, therefore, exists in the fluid chamber 32. This pressure exerts a force on the diaphragm 33.

The fluid flows from the chamber 32 to the chamber 37 through the orifice 35 in passageway 36. The passageway 36 and the orifice 35 cause a pressure drop $\Delta P_2$. A pressure, $P-(\Delta P_1+\Delta P_2)$, therefore exists in the chamber 37. This pressure causes a force to be exerted upon the diaphragm 33. Since the pressure $P-\Delta P_1$ exists on one side of the diaphragm and the pressure $P-(\Delta P_1+\Delta P_2)$ exists on the other side of the diaphragm, a net force is exerted upon the diaphragm, which is proportional to the pressure drop $\Delta P_2$. The net force caused by the pressure $\Delta P_2$ is transmitted to the shaft 63.

A force proportional to the second input signal $P_b$ is also exerted upon the shaft 63 by the bellows 62, and this force is opposed by force exerted on the diaphragm 33 by pressure $\Delta P_2$. The shaft 63 will, therefore, move to actuate the fluid-servo valve when the forces caused by $\Delta P_2$ and $P_b$ are not equal. The actuation of the fluid-servo valve by the shaft 63 will, in turn, alter the value of the pressure $P_b$ will, and the right side of the Equation 5 will tend towards a value of unity. In summary, the passageway 36, chambers 32 and 37, diaphragm 33, bellows 62 and the shaft 63 serve as a means for comparing the second input signal with the pressure drop across the second orifice and causing an output signal when they are not equal.

The fluid flows from the chamber 37 through the passageways 40 and 56 and the third restriction means 55 returning to the fluid reservoir by way of pipe 19. The fluid from chamber 37 also flows into chamber 41 causing a pressure $P-(\Delta P_1+\Delta P_2)$, which exerts a force against the diaphragm 27. The pressure P exists on the other side of the diaphragm 27. The diaphragm 27, therefore, transmits a net force to the shaft 53 which is proportional to the sum of the pressure drops $\Delta P_1+\Delta P_2$. It should be recalled from Equation 3 that $\Delta P_1+\Delta P_2=\Delta P$.

The force $\Delta P$ transmitted to the shaft 53 is opposed by a force caused by the first input signal $P_a$. If the pressure $P_a$ and $\Delta P$ are not equal, the shaft 53 will move. The movement of the shaft 53 causes the variable restricting means 54 to change the rate of flow through the third restriction means 55. The change in the rate of the fluid flow through the third restriction means 55 will cause a change in the rate of the fluid flow through the other restriction means 30 and 35. It should be recalled that the pressure drop $\Delta P$ is a function of the rate of flow. The shaft 53 will, therefore, continue to move, adjusting the rate of fluid flow until the pressure $\Delta P$ equals the pressure $P_a$.

It is apparent from the above description that the left side and right side of Equation 5 will tend towards unity, and consequently towards satisfying the Equation 5 and equaling the selected variable.

In satisfying the equation, the chambers 26 and 41, diaphragm 27, shaft 53, bellows 52, restricting means 54 and third restriction means 55 function as a means for summing the pressure drops across the first and second orifices comparing the sum of the pressure drops across the first and second orifices with the first input signal and adjusting the sum of the pressure drop so that it is equal to the first input signal.

In concluding, the effect of a change in one of the input signals will be considered. If the input signal $P_a$ is increased, the bellows 52 will tend to open the third flow restriction means 55, causing an increase in the pressure drop across the first and second fluid restriction means 30 and 35. The increase in the pressure drop will cause the shafts 53 and 63 to move in an upward direction. The movement of the shaft 53 in an upward direction opposes the movement caused by the initial change of input signal $P_a$, thereby tending to stabilize the shaft 53. The movement of the shaft 63 in an upward direction actuates the fluid-servo valve 64 to increase the input signal $P_b$, whereby the bellows 62 is depressed and the shaft 63 is moved downwardly. The downward movement of the shaft 63 opposes the initial upward movement caused by the increase in the pressure drops, thereby tending to stabilize the shaft 63.

It should be understood that the foregoing description is only exemplary. In the above description the effective areas of the diaphragms and bellows were considered to be equal. The particular effective areas utilized are considered a matter of design choice. Further, it is possible for the fluid-servo valve to alter both pressure signals $P_a$ and $P_b$ rather than the pressure signal $P_a$.

The pressure ratio controller can be used in gas turbine engines to regulate the amount of compressor bleed air. During gas turbine starting conditions it is sometimes necessary to bleed the compressor until the engine reaches a self-sustaining or higher speed. The point at which the compressor bleed must close is dictated by the ratio of the compressor outlet to inlet pressure. On engines with variable exhaust nozzles the point at which the exhaust nozzle is opened or closed is also dictated by this pressure ratio of the compressor. The utilization of a pressure ratio controller in a gas turbine engine is discussed in greater detail in U.S. Patents 2,657,233 and 2,858,700.

In steel making operations, the amount of fuel and air entering the blast furnace must be controlled to prevent either incomplete combustion due to too much fuel or the chilling of the furnace temperature due to too much air. In this case, the fuel and air flows are measured by pressure drops across an orifice in each line. These pressure drops are then applied to the pressure ratio controller which will maintain a selected fuel-to-air ratio.

An alternative embodiment of the invention is shown in FIGURE 2. This embodiment can be used for measuring the ratio of two unknown pressures. The embodiment operates according to the principles described above. The fluid-servo valve 64 is replaced by a dial indicator 70 which indicates any movement of the shaft 63 from a null position. The second fluid restriction means is replaced by an adjustable fluid restriction means or more particularly a calibrated needle valve 71. The needle valve 71 can then be adjusted to give a null reading on the dial indicator 70. The correct pressure ratio is then read from the calibrations on the needle valve 71.

In the operation of this embodiment, input signals $P_a$ and $P_b$ are applied to the pressure ratio controller. As explained in the paragraphs describing the operation of the embodiment shown in FIGURE 1, the shafts 53 and 63 will tend to assume a given position. The stabilized position of the shaft 63 will be indicated on the dial indicator 70. Assuming the position of shaft 63 to be other than the null position, the needle valve 71 will then be adjusted. The adjustment of the needle valve 71 will cause the pressure drop across the flow restriction means 35 to change which, in turn, will alter the pressure existing in the fluid chambers 37 and 41. The pressure change in these fluid chambers will cause the shafts 53 and 63 to assume a different position. The change in the position of the shaft 53 will cause the variable flow restriction means 54 to further alter the pressure drops across the fluid restriction means 30 and 35. The shafts 53 and 63 will eventually assume a new stabilized position, reflecting a new dial indicator reading. The needle valve 71 may be adjusted until the shaft 63 reflects a null position on the dial indicator 70. The pressure ratio of the input signals $P_a$ and $P_b$ may then be read on the calibrated valve.

It is believed that the pressure ratio controller described above represents a simplification over prior art devices without sacrificing accuracy.

It will be understood that the invention is not to be limited to the exact construction shown and described and that various changes and modifications may be made without departing from the spirit and scope of the invention, as defined in the appended claims.

I claim:
1. In a pressure ratio controller, the combination comprising:
   (a) a first pressure drop device,
   (b) a second pressure drop device,
   (c) means for summing and comparing the sum of the pressure drops across said first and second pressure drop devices with a first input signal, and for adjusting the pressure drop across said first and second pressure drop device so that the sum of the pressure drops equal the first input signal,
   (d) means for comparing the pressure drop across said second pressure drop device with a second input signal and for causing an output signal when the second input signal and the drop across said second pressure drop device are not equal,
   (e) and means operable by said output signal for causing said second input signal to equal the pressure drop across said second pressure drop device.

2. In a pressure ratio controller, the combination comprising:
   (a) a first orifice,
   (b) a second orifice,
   (c) means for summing and comparing the sum of the pressure drops across said first and second orifices with a first input signal and for adjusting the pressure drop across said first and second orifices so that the sum of the pressure drops equal the first input signal,
   (d) means for comparing the pressure drop across said second orifice with a second input signal and for causing an output signal when the second input signal and the drop across said second orifice are not equal,
   (e) and means operable by said output signal for causing said second input signal to equal the pressure drop across said second orifice.

3. In a pressure ratio controller, the combination comprising:
   (a) a first flow restriction means,
   (b) a second flow restriction means,
   (c) means for summing and comparing the sum of the pressure drops across said first and second flow restriction means with a first input signal, and for adjusting the pressure drop across said first and second flow restriction means so that the sum of the pressure drops equal the first input signal,
   (d) means for comparing the pressure drop across said second flow restriction means with a second input signal and for causing an output signal when the second input signal and the drop across said second flow restriction means are not equal,
   (e) and means operable by said output signal for causing said second input signal to equal the pressure drop across said second flow restriction means.

4. In a measuring instrument the combination comprising:
   (a) a flow restriction means,
   (b) a second flow restriction means, said second flow restriction means having a calibrated adjustment means for adjusting the geometry of said second flow restriction means,
   (c) a first means for summing and comparing the sum of the pressure drops across said first and second flow restriction means with a first input signal and for adjusting the pressure drops across said first and second flow restriction means so that the sum of the pressure drops equal the first input signal,
   (d) a second means for comparing the pressure drop across said second flow restriction means with a second input signal and for causing an output signal when the second input signal and the drop across said second flow restriction means are not equal, and
   (e) a meter adapted to receive the output signal of said second means.

5. In a pressure ratio controller, the combination comprising:
   (a) a first flow restriction means,
   (b) a second flow restriction means,
   (c) a first means for summing and comparing the sum of pressure drops across said first and second flow restriction means with a first input signal, and for adjusting the pressure drop across said first and second flow restriction means so that the sum of the pressure drops equal the first input signal, said first means comprising:
      (1) a first movable force balance member,
      (2) a first pressure responsive force member coupled to said first and second flow restriction means to develop a force proportional to the sum of the pressure drops across said first and second flow restriction means, said first pressure responsive force member coupled to said first movable force balance member,
      (3) a second pressure responsive force member operatively coupled and responsive to said first input signal to develop a force proportional to said first input signal, said second pressure responsive force member coupled to said force balance member,
   (d) a second means for comparing the pressure drop across said second flow restriction means with a second input signal and for causing an output signal when the second input signal and the drop across said second flow restriction means are not equal, said second means comprising:
      (1) a second movable force balance member,
      (2) a third pressure responsive force member coupled to said first and second flow restriction means to develop a force proportional to the pressure drop across said second fluid restriction means, said third pressure responsive force member connected to said second movable force balance member,
      (3) a fourth pressure responsive force member operatively coupled and responsive to said second input signal to develop a force proportional to said second input signal, said fourth pressure responsive force member coupled to said second force balance member,
   (e) and means coupled to said second means and operable by said output signal for causing the second input signal to equal the pressure drop across said second flow restriction means.

6. In a pressure ratio controller, the combination comprising:
   (a) a first flow restriction means,
   (b) a second flow restriction means,
   (c) a first means for summing and comparing the sum of pressure drops across said first and second flow restriction means with a first input signal, and for adjusting the pressure drop across said first and second flow restriction means so that the sum of the pressure drops equal the first input signal, said first means comprising:
      (1) a first movable force balance member,
      (2) a first pressure responsive force member coupled to said first and second flow restriction means to develop a force proportional to the sum of the pressure drops across said first and second flow restriction means, said pressure responsive force member coupled to said movable force balance member, (3) a second pressure responsive force member operatively coupled and responsive to said first input signal to develop a force proportional to said first input signal, said second pressure responsive force member coupled to said first balance member, (4) a third fluid restriction means for adjusting the sum of said pressure drop across said first and second fluid restriction means when the first input signal and the sum of the pressure drops across said first and second fluid restriction means are not equal, said third fluid restriction means coupled to said first movable force balance member and said first and second fluid restriction means, (d) a second means for comparing the pressure drop across said second flow restriction means with a second input signal and for causing an output signal when the second input signal and the drop across said second flow restriction means are not equal, said second means comprising:

(1) a second movable force balance member, (2) a third pressure responsive force member coupled to said first and second flow restriction means to develop a force proportional to the pressure drop across said second fluid restriction means, said third pressure responsive force member connected to said second movable force balance member, (3) a fourth pressure responsive force member operatively coupled and responsive to said second input signal to develop a force proportional to said second input signal, said fourth pressure responsive force member coupled to said second force balance member, (4) a control element for adjusting the second input signal so that said input signal equals the pressure drop across the second flow restriction means, said control element coupled to said second movable force balance member.

7. In a pressure ratio controller, the combination comprising:

(a) a housing,
(b) a first flow restriction means in said housing,
(c) a second flow restriction means in said housing,
(d) a variable flow restriction means in said housing,
(e) a first diaphragm placed in said housing to form a first and second fluid chamber,
(f) a second diaphragm placed in said housing to form a third and fourth fluid chamber,
(g) said first flow restriction means connecting said first and said third fluid chambers,
(h) said second flow restriction means connecting said third and said fourth fluid chambers,
(i) said second fluid chamber connected to said fourth fluid chamber,
(j) said variable flow restriction means connected to said second and said fourth fluid chambers,
(k) a first pressure responsive means for receiving a first input signal, said first pressure responsive means being operatively coupled to said first diaphragm and adapted to vary the setting of said variable flow restriction means,
(l) a second pressure responsive means for receiving a second input signal, said second pressure responsive means being operatively coupled to said second diaphragm and adapted to alter said second input signal so that said second input signal equals the pressure drop across said second flow restriction means.

8. A pressure ratio controller comprising:
(a) a housing,
(b) a fluid flow path positioned in said housing and containing a first and a second orifice connected in series,
(c) a source of fluid under pressure connected to said fluid flow path,
(d) a first pressure responsive means positioned within said housing,
(e) a second pressure responsive means positioned within said housing,
(f) a first pressure input signal operatively coupled to and acting upon said first pressure responsive means,
(g) a second pressure input signal operatively coupled to and acting upon said second pressure responsive means,
(h) a variable orifice including a movable valve member connected in series with said first and said second orifices,
(i) means connected to said movable valve member and to said first pressure responsive means for comparing the sum of the pressure drops across said first and said second orifices with said first pressure input signal and for moving said movable valve member to adjust the fluid flow through said variable orifice and said first and second orifices to the point where the sum of the pressure drops across said first and second orifices equals said first input signal, and
(j) means connected to said second pressure responsive means for comparing the pressure drop across the second flow restriction means with said second pressure input signal and for causing an output signal when the pressure drop across said second flow restriction means and said second pressure input signal are not equal,
(k) and means operable by said output signal for causing said second pressure input signal to equal the pressure drop across said second flow restriction means.

9. In a pressure ratio controller, the combination comprising:
(a) a first flow restriction means,
(b) a second flow restriction means,
(c) means for summing and comparing the sum of the pressure drops across said first and second flow restriction means with a first input signal, and for adjusting the pressure drop across said first and second flow restriction means so that the sum of the pressure drops equal the first input signal,
(d) means for comparing the pressure drop across said second flow restriction means with a second input signal and for causing an output signal when the second input signal and the drop across said second flow restriction means are not equal,
(e) control means for altering said second input signal to cause said second input signal to become equal to the drop across said second flow restriction means, said control means adapted to respond to said output signal.

References Cited by the Examiner

UNITED STATES PATENTS

| | | | |
|---|---|---|---|
| 2,792,685 | 5/57 | Constantino et al. | 73—407 |
| 2,981,058 | 4/61 | Reed | 73—407 |
| 3,046,790 | 7/62 | Bauer | 73—407 |

RICHARD C. QUEISSER, *Primary Examiner.*

ROBERT L. EVANS, *Examiner.*